United States Patent Office 3,466,498
Patented Sept. 9, 1969

3,466,498
TIMEKEEPING SYSTEM UTILIZING GLOW DISCHARGE TUBE
Heinz A. de Koster, Stamford, Conn., and Michael J. Ingenito, Bronx, N.Y., assignors to General Time Corporation, Stamford, Conn., a corporation of Delaware
Filed Sept. 23, 1966, Ser. No. 581,592
Int. Cl. H01j 17/36
U.S. Cl. 315—84.6                           6 Claims

ABSTRACT OF THE DISCLOSURE

An improved electronic counting system which may be used as a timekeeping system, including a glow discharge tube containing an ionizable gas and a series of spaced internal electrodes. The electrodes are interconnected so as to form two or more operative cathode groups, and all of the groups are connected to a control circuit which applies a transfer potential to the various groups sequentially so as to transfer a glow discharge cyclically from one group to another, and along successive electrodes in the glow discharge tube. The glow discharge is transferred directly between successive cathodes, so that no intermediate transfer cathodes are required. The control circuit which controls the application of the transfer potential to the various electrode groups is connected between the respective groups and is directly responsive to a glow discharge in one of the cathode groups for automatically applying the transfer potential to another cathode group in response to an electrical input signal, which may represent preselected time intervals. Several different embodiments of the control circuit are disclosed.

---

This application is a continuation-in-part of an earlier application filed Feb. 1, 1966, Ser. No. 524,027 by Heinz A. de Koster entitled "Electronic Clocks" assigned to the assignee of this application. That application is incorporated herein by reference.

The invention of this application relates to electronic counters; more particularly, it relates to electronic counters employing cold cathode discharge tubes, so-called "glow cathode" tubes for counting and display.

Cold cathode discharge tubes have long been employed for counting and display. In these tubes a plurality of identical cathodes are equally spaced in a lineal array, usually a circle, and are equally spaced from a common anode. Normally, there are three times as many cathodes as the highest number of unit counts that may be counted by the tube. For example, in the most common prior art tube, known as the "Dekatron," thirty rod-shaped cathodes are symmetrically arranged around a central anode disc. Every third electrode of the thirty cathodes is connected together. A potential source is connected to a circuit connected to what are known as the "index" or "position" cathodes to maintain a glow discharge between one of the index cathodes and the anode. In response to a unit count, the glow is switched from one index cathode to the next index cathode by applying two successive pulses to two other circuits so as to transfer the glow successively to each of a pair of cathodes (known as the "guide" or "transfer" cathodes) connected thereto and arranged between two successive index cathodes.

While the above-identified prior art tubes have been commercially successful when used for counting and count display, they have many disadvantages. For example, the tubes, comprising thirty separate rod-shaped cathodes and a disc anode, are expensive to manufacture. Since the glow surrounds a rod-shaped cathode pointing at the observer, much of the light therefrom is radiated away from the observer and is not useful for display.

The glow in such prior art glow discharge counting tubes is switched from one cathode to the next. Because a glowing cathode supplies some stray ionization to the cathodes on both sides of the glowing cathode, this stray ionization "primes" said cathodes, i.e., it insures that when a voltage, slightly above that required to maintain a glow, is applied to the circuit connected to one of the primed cathodes, that cathode will "strike" or "ignite" that is, begin to glow. The other cathodes, not having been primed by the stray ionization, will not ignite as a higher potential is required because of the lack of initiating ions thereat. The time it takes to switch the glow from one cathode to the next depends upon the time it takes a glow avalanche to build up at a primed adjacent cathode. The counting speed in such glow discharge tubes depends on this ignition time and on the time it takes the ionization to decay at a recently glowing cathode. For example, if one attempts to switch the glow too rapidly, nearby cathodes, perhaps a cathode that was glowing two or three switching times earlier, may still be primed and an improper cathode may be ignited.

The drive circuits for cold cathode counting tubes of the prior art are quite critical in that for every unit count signal received by the drive circuit, the drive circuit must provide two pulses for the guide cathodes of proper amplitude and duration and at precisely defined times with respect to each other. This is particularly difficult to accomplish at high counting speeds.

While glow discharge counting tubes have been designed in the prior art employing other configurations than that of Dekatron, they have either required four cathodes for each unit count, as in the so-called single pulse Dekatron, or have required twice as many asymmetrical cathodes as the total number of unit counts to be counted by the tube.

An all electronic clock with no moving parts has long been considered a desirable goal. The clock could count the oscillations of the power line voltage as is done by a synchronous clock. However, simple, inexpensive means have not been available for performing this counting function. For example, cascaded binary counters, as disclosed in U.S. Patent No. 2,410,156 of L. E. Flory, even if transistorized are prohibitively expensive for most clock applications. Furthermore, electronic clock display means of the prior art are in large measure unsatisfactory. For example, Flory discloses a plurality of neon tubes, twelve separate tubes to indicate the hour and sixty tubes to indicate the minute; thus requiring seventy-two separate circuit connections to his counter.

Various other types of electronic displays have been proposed, such as in A. McNicolsen, U.S. Patent Nos. 2,055,982 and 2,114,500, and in H. S. Polin, U.S. Patent No. 3,195,011. The latter patent proposes the use of binary counters to convert the line frequency to one pulse per minute, the use of six decade glow discharge tubes to count the minutes, and a separate display tube for displaying the minute indication; the hour indications being similarly counted and displayed. None of these prior art systems have proved practicable for mass-produced inexpensive clocks.

It should be borne in mind that a self-contained clock comprises: a stable oscillator, e.g., a pendulum, balance wheel, tuning fork, or electronic oscillator; means for counting the oscillations of the oscillator, e.g., an escapement, synchronous motor, or electronic counter; and, means for displaying a time indication (that is, the total count), e.g., hands, dials, or other display means. Most electric clocks that operate off electric power lines are of the synchronous variety. That is, they contain no oscillator themselves but rely on the oscillations of the power line voltage and, in effect, count these oscillations. It will thus be seen that an eletcric clock, particularly an electronic clock, is merely a special form of counter that counts uniformly-timed pulses and displays the count on the basis of sixty second per minute and sixty minutes per hour up to twelve hours. For that reason, the words counter and clock can often be used interchangeably. Where each term is used herein, the other is also meant whenever the sense permits.

Canadian Patent No. 696,292 discloses a clock wherein four glow discharge counting and display tubes are arranged within a single envelope. These comprise sixty position or index cathodes for counting the power line pulses, sixty position or index cathodes for counting second pulses, sixty position or index cathodes for counting minute pulses, and thirty-six position cathodes for counting and indicating the hours. However, this clock, being constructed in accordance with the prior art glow cathode counting tubes, requires a pair of transfer or guide cathodes between each pair of position or index cathodes for transferring the glow from one position cathode to the other. Thus, there are in fact three times as many cathodes within the envelope of the clock as required for time indication. Each of these cathodes is a vertically oriented pin upstanding from a circuit board. As will be obvious to those versed in the art of constructing electron tubes, the construction of such an electron tube, having six hundred and forty-eight cathodes, four anodes, one for each array of cathodes, and innumerable interconnections both internal and external to interstage circuitry, is prohibitively expensive for all but the most exotic clock applications.

It is, therefore, an object of the present invention to provide novel electronic counters for counting and display.

Another object of the invention is to provide electronic counters of the glow discharge type having fewer number of cathodes than heretofore possible.

A further object of the invention is to provide electronic counters of the above character by printed circuit techniques.

A still further object of the invention is to provide such electronic counters employing no guide or transfer cathodes.

A yet further object of the invention is to provide such electronic counters employing asymmetrical electrodes.

Another object of the invention is to provide drive circuits for electronic counters of the above character.

Another object of the invention is to provide drive circuits of the above character employing only passive electrical elements.

Yet another object of the invention is to provide drive circuits of the above character which are standard, may be mass-produced for driving counters, and easily provide different total counts.

A further object of the invention is to provide such electronic counters and drive circuits that are rugged, durable, long-lived and may be mass-produced inexpensively.

A still further object of the invention is to provide electronic counters of the above character that may be conveniently cascaded together.

Other objects of the invention will in part be obvious; in part appear in the above-identified co-pending application, Ser. No. 524,027; and will in part appear hereinafter.

For a fuller understanding of the nature and objects of the invention, reference should be had to the following detailed description taken in connection with the accompanying drawings in which.

The same reference characters refer to the same elements throughout the several views of the drawings.

GENERAL DESCRIPTION

In order to understand the present invention, the principles of gas discharges must be borne in mind. In order to obtain a gas discharge, a pair of electrodes are spaced apart in an envelope containing a gas, usually at low pressure. An electrical potential is applied across the electrodes. Since ideal gases do not conduct electricity, intially no current should flow between the positively charged anode and the negatively charged cathode. However, the gas between the electrodes is subject at all times to bombardment by cosmic rays and other nuclear radiation from natural sources. Some of the particles of these rays collide with gas atoms between the electrodes. The atoms emit electrons and become ionized in that they lack or gain an electron and become positive or negative ions.

The positively charged atoms are attracted to the cathode. If the potential between the cathode and the anode is small or the spacing great, chances are that an ionized atom will combine with a free electron in the gas, again becoming a neutral atom, before reaching the cathode. Thus only a very small current will flow between the cathode and anode. A few positive ions that have travelled far enough, if the voltage is great enough, will gain enough energy and momentum that, upon hitting the cathode, they release one or more electrons. Furthermore, electrons and negative ions travelling towards the anode, if the potential is great enough and the distance travelled before collision with the gas molecule is great enough, may gain sufficient momentum to ionize a gas atom upon collision. At low potentials and great electrode spacing, the loss of ions and electrons by diffusions to the walls of the vessel and by recombination into neutral atoms, is much more likely than the production of new ions through the various described collision processes. However, for a given electrode spacing, once a certain characteristic potential is reached, herein called the breakdown voltage, more ions are created by collision processes than are lost by diffusion and recombination. At this point, the current flowing in the discharge increases abruptly and would become infinite if it were not for the external resistance in the circuit. There then exists a characteristic glow, spaced ordinarily approximately half a millimeter from the cathode, known as the cathode glow. This glowing region is a region of intense ionization. Ordinarily, the glow will not cover the entire surface of the cathode. The area of the cathode so covered is proportional to the current between the electrodes.

If a potential equal to or greater than the breakdown voltage is applied across the electrodes of a gas discharge tube in which no glow is present, a certain amount of time, called the ionization time, in the order of some microseconds, will be required for the ionization and thus the current to build up to that limited by the external resistance in the circuit. Initial ionization is supplied, as previously stated, by the cosmic radiation or natural nuclear radiation in the environment. However, the characteristic breakdown voltage must be applied across the electrodes in order to initiate the glow discharge.

If a pair of electrodes are located adjacent to an existing glow discharge, a distance normally of a few millimeters, the space between the electrodes will be partially ionized due to diffusion of electrons and ions from the existing glow discharge. This degree of ionization is much greater than that due to natural sources. This ionization reduces the breakdown voltage to the so-called transfer voltage. It is this effect that makes possible the shifting of a glow discharge from one cathode to an adjacent cathode in a lineal array in the previously described Dekatron tubes and in the present invention. Cathodes next to a glowing cathode that have a reduced breakdown voltage (the transfer voltage) are referred to as "primed" cathodes.

When a glow discharge exists between a cathode and an anode, a characteristic potential will exist therebetween, herein called the maintaining voltage, which is a characteristic of the gas. In order to maintain a glow discharge, the external circuitry connected to the cathode and anode must be able to supply current to them at the maintaining voltage. If the potential supplied to the cathode and anode is allowed to drop below the maintaining voltage, the glow discharge will terminate. However, the cathode will remain primed for the deionization time of the gas, i.e., the time it takes most of the ionized atoms to recombine with free electrons. For most gases this time is in the order of some microseconds and is much larger than the ionization time. For further understanding of the characteristics of such gas discharge devices, reference may be made to such texts as: Acton & Swift, Cold Cathode Discharge Tubes, Academic Press, Inc., New York, 1963; Rudolf Seeliger, Angewandte Atomphysik, Julius Springer, Berlin, 1938; and Leonard B. Loeb, Basic Processes of Gaseous Electronics, 2nd edition, University of California Press, 1955.

Now referring to FIGURES 1 through 9, the electronic counters 20 of the present invention comprise a plurality of equally-spaced cathodes 26 (e.g., as in FIGURE 1) in an atmosphere suitable for supporting a gas discharge. The cathodes 26 (FIGURES 1, 2 and 3), 54 (FIGURES 5, 6 and 7), and 64 (FIGURE 9) may be arranged in a circle on flat substrates; they may be arranged in a straight line; or in serpentine fashion; or they may be a plurality of upstanding pins as in the prior art Dekatron tubes. The cathodes are equally spaced from a common anode which may be a screen 30 overlying them, as in FIGURE 2, a flat plate 58 with character shaped holes 62 therein as in FIGURE 8, or a flat disc 72 in the same plane as a circular array of cathodes 64, as in FIGURE 9.

Figure 10:
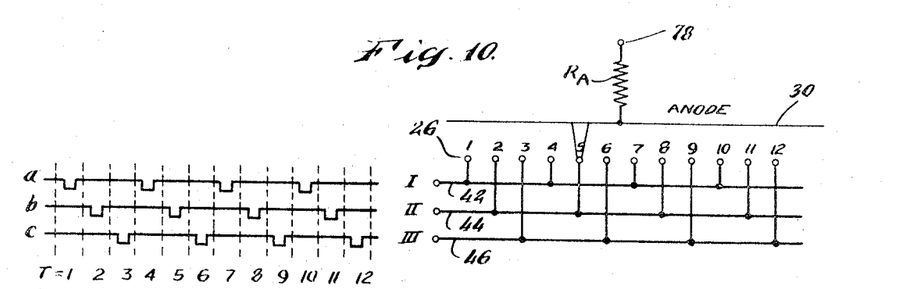
FIGURE 10 is a diagram illustrating a principle of the present invention.
Figure 11:
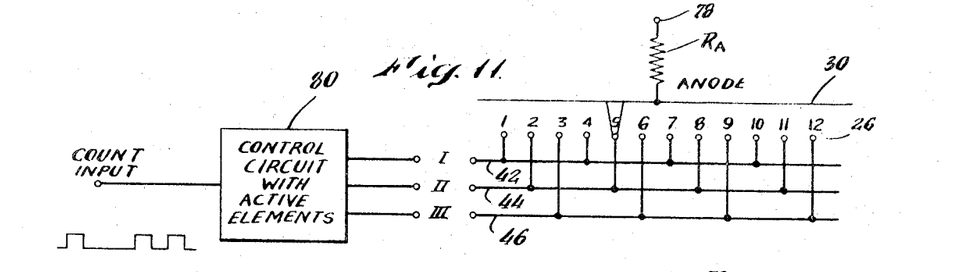
FIGURE 11 is a diagram illustrating a principle of the present invention.
Figure 12:
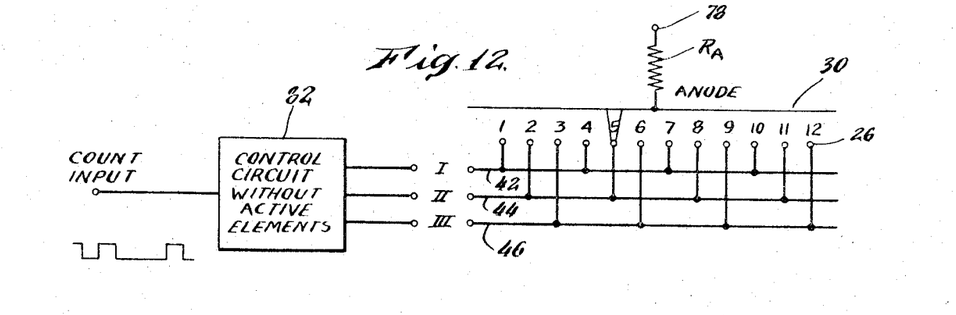
FIGURE 12 is a diagram illustrating a principle of the present invention.
Figure 13:
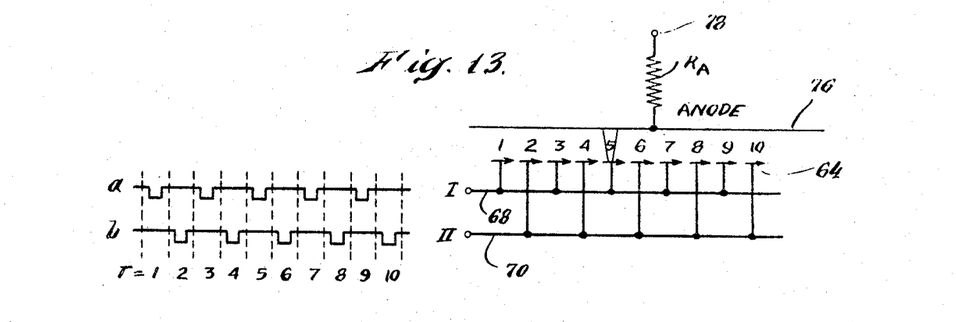
FIGURE 13 is a diagram illustrating a principle of the present invention.

Now referring to FIGURES 10 and through 13, the cathodes are iteratively connected into a multi-phase circuit. For example, the cathodes of FIGURES 10, 11, and 12 are connected into three phase circuits providing common terminals I, II and III. If the cathodes employ directors 66, as in the embodiment of FIGURE 9, or other asymmetric transfer means, they may be represented by arrows, as shown in FIGURE 13, the arrows indicating the preferred transfer direction. Asymmetrical cathodes may be connected into a two-phase circuit providing common terminals I and II, as shown in FIGURE 13.

A most important and significant distinction of the present invention over the prior art is that each of the cathodes of the invention is a position cathode and no guide cathodes are employed.

Operation of gas discharge counting tubes according to the present invention may be understood with reference to FIGURE 10 as follows: The anode 30 is connected to a source of positive potential (not shown) at terminal 78 through resistor $R_A$. Each of the electrode terminals connected to common terminals I, II and III is supplied with a potential bias sufficiently negative to maintain a glow discharge between the anode 30 and any one of the cathodes 26 and the anode 30 as indicated by the horizontal line portion of the voltage waveforms a, b and c in the timing diagram to the left of FIGURE 10. The waveforms a, b and c being applied to terminals I, II and III, respectively. In response to incoming unit count pulses, a control circuit, as shown in FIGURES 11 and 12, connected to terminals I, II and III, provides a three-phase stepping action by providing the negative pulses shown in the timing diagram of FIGURE 10 in rotation to the three terminals I, II and III. Assuming that a glow exists at cathode 5, it will be maintained by the positive potential supplied to the anode and the negative potential bias supplied at terminal II. Ions will diffuse to the gaps between cathodes 4 and 6 and they will be "primed" so that by the application of a potential less than the breakdown voltage they will ignite and support a glow discharge. This potential is called the transfer voltage.

Cathode 5 was ignited in response to a negative pulse at terminal II at time $T=5$, as indicated in the timing diagram. Upon the application of a negative pulse at time $T=6$ at terminal III, the potential at all cathodes connected thereto, i.e., cathodes 3, 6, 9 and 12, will be lowered to that of the transfer voltage. However, only cathode 6 will both be primed and have a transfer potential applied thereto. Thus, a glow will begin only at cathode 6. Initially, while the negative switching pulse at $T=6$ still exists, the initial current through the second glow discharge from the anode 30 to cathode 6 will require the drawing of additional current through anode resistor $R_A$. This will cause the potential at anode 30 to become less positive and will drop the voltage between anode 30 and cathode 5 below the maintaining voltage and the gas discharge at cathode 5 will cease. The anode potential will then become more positive resuming its normal voltage and will continue to support the glow at cathode 6 even after the termination of the negative pulse at time $T=6$.

The glow is not switched to cathode 3 because it is too far distance from cathode 5 to be primed, even though the potential at cathode 3 is momentarily that of the transfer voltage. The glow is not switched to cathode 4 or 7 because these cathodes are not supplied with the transfer voltage during this switching period.

It should be noted that a three-phase circuit is required to provide that the glow always switches in the same direction when symmetrical cathodes are employed in the illustration system, because the influence of each cathode on its neighbors is the same in both directions. When this is not the case, as shown in FIGURE 13, a two-phase circuit may be employed according to the invention. Here, in response to each unit pulse, the terminals I and II are alternately negatively pulsed, as indicated by the voltage waveforms $a$ and $b$ in the timing diagram portion of FIGURE 13. The terminals I and II are biased at a negative potential sufficient to support a glow discharge between any growing cathode connected thereto and the anode as in the previous example. Assume again that cathode 5 is glowing. When the $T=6$ pulse is supplied to terminal II, the transfer voltage will be applied to cathodes 2, 4, 6, 8, 10 and 12 connected thereto. However, because of the asymmetrical effect, cathode 6 being more sufficiently primed than cathode 4, only cathode 6 will begin to glow at the transfer potential. Initiation of this glow discharge drops the positive potential at the anode below that sufficient to sustain a discharge at cathode 5, that glow is extinguished and the glow is now fully transferred to cathode 6. Thus, with asymmetrical cathodes, the glow may be transferred in one direction with only a two-phase circuit. It should be noted, however, that in a two-phase asymmetric system the glow may not be transferred backwards, i.e., from cathodes 5 to 4 to 3, etc. as can be done in the case of three-phase circuits, shown in FIGURES 10, 11 and 12, by merely reversing the sense of rotation of the negative pulses from terminals I, II, III, I, II, etc. to terminals III, II, I, III, II, etc.

Figure 14:
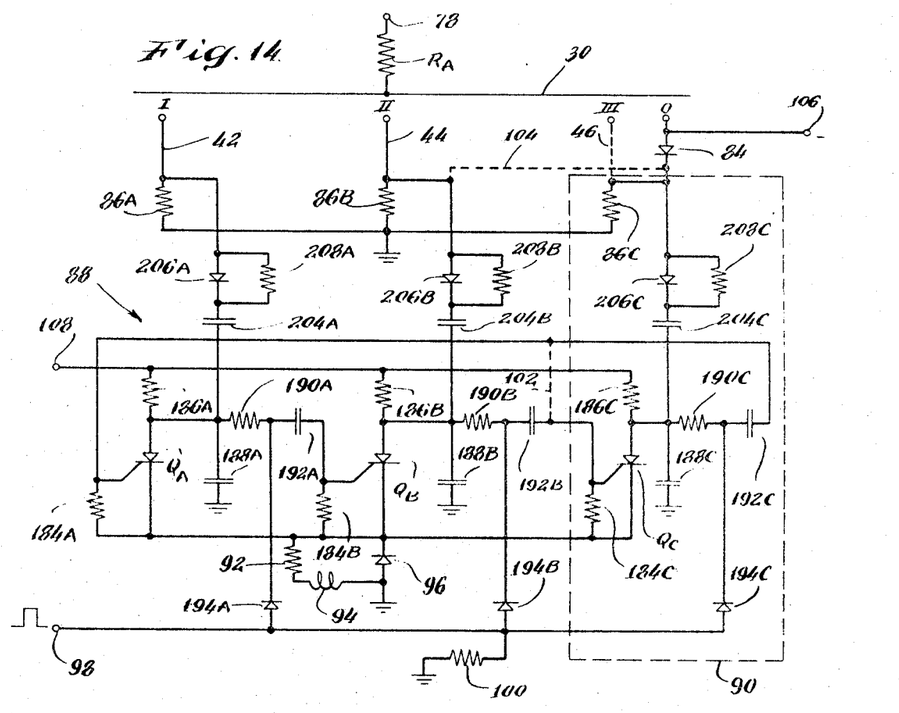
FIGURE 14 is a schematic circuit diagram of a control circuit with active elements as shown in FIGURE 11, the counter tube being shown schematically.
Figure 21:
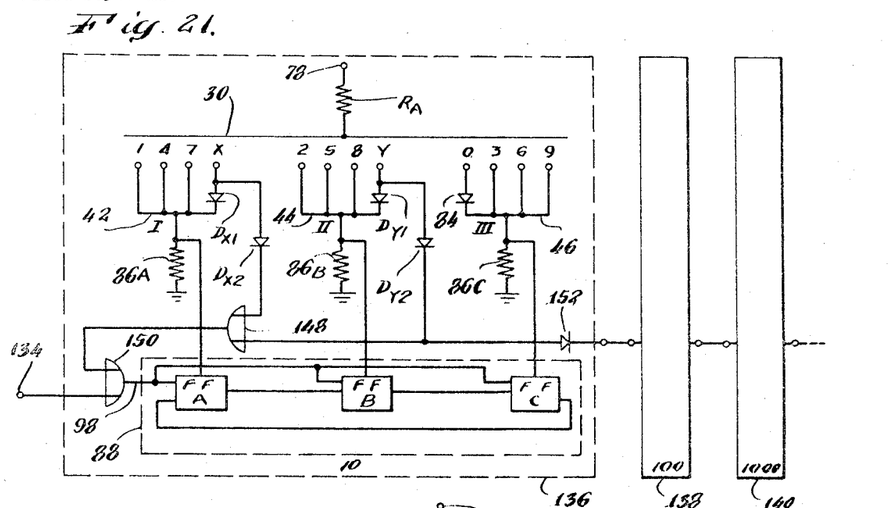
FIGURE 21 is a logic block diagram of a multi-stage counter circuit according to the present invention, the counter tube being shown schematically.

Control circuits, according to the invention, may employ active elements as shown in FIGURE 11 in which case the control circuit may not be influenced by the counting tube itself, as in the case of the ring counter circuits shown in FIGURES 14 and 21. On the other hand, the control circuit may employ no active elements as shown in FIGURE 12 in which case the glowing cathode connected to one of the terminals I, II, III affects the circuit such that a unit count pulse supplied thereto causes appropriate switching to initiate the glow at the adjacent cathode connected to the next succeeding control terminal. This may be distinguished from the ring counter situation in that the condition of the glow in the counter tube supplies the memory determining the next control terminal to be operated on. Such circuits are shown in FIGURES 15, 17, 18, 19, 23 and 24. While the circuits of FIGURES 15 and 17 employ only passive elements, the circuits of FIGURES 18, 19, 23 and 24 employ active elements as coincident gates, so-called logical AND gates, for convenience.

Figure 15:
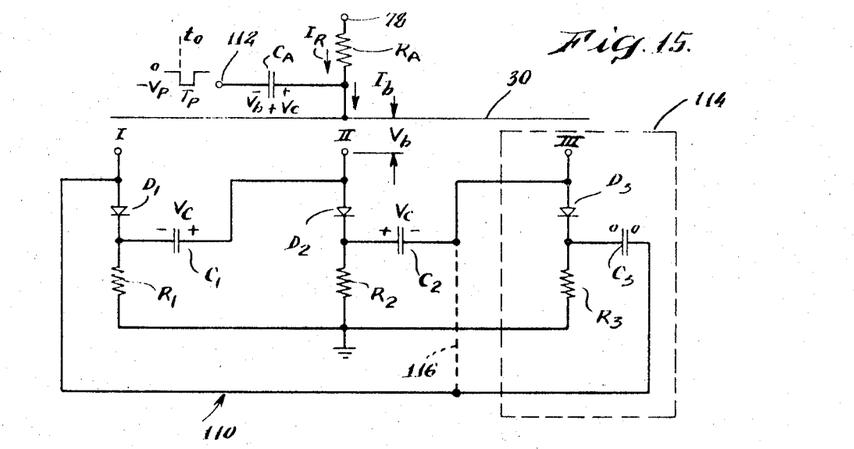
FIGURE 15 is a schematic circuit diagram of a control circuit without active elements as shown in FIGURE 12, the counter tube being shown schematically.
Figure 17:
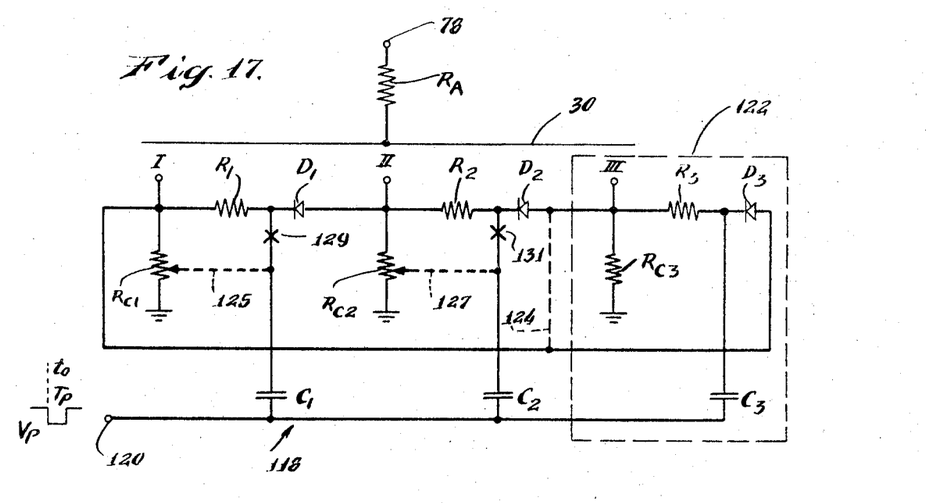
FIGURE 17 is a schematic circuit diagram of an alternative form of control circuit without active elements as shown in FIGURE 12, the counter tube being shown schematically.

It should also be noted that the operation of the circuits of FIGURES 15 and 17 is somewhat different than that illustrated in the timing diagrams of FIGURES 10 and 13. In the circuit, shown in FIGURE 15, application of a unit count pulse to anode 30 through capacitor $C_A$ drops the cathode to anode potential to all of the cathodes connected to the terminals I, II and III to below that sufficient to maintain a glow and the discharging of capacitors $C_1$, $C_2$, and $C_3$ directionally charged according to which terminal the glowing cathode was connected, causes a negative potential to be applied to the next succeeding terminal sufficient to initiate a glow at a primed cathode.

In the circuit illustrated in FIGURE 17, a unit count pulse supplied to input terminal 120 is preferentially applied to the correct terminal due to the biasing effect of the diodes $D_1$, $D_2$, and $D_3$ of the circuit and the previously glowing cathode. This initiates a second glow discharge at a cathode connected to the biased terminal. The prior glow discharge is then extinguished in the manner previously explained with reference to FIGURES 10 and 13.

It will be apparent to those skilled in the art that although the resistance $R_A$ is shown connected directly to the anode 30 in all circuits disclosed herein, it may be located anywhere in the circuit including the cathodes 26, anode 30 and power supply therefor (not shown). Its purposes in all circuits is to limit the current in the counting tube and in some is to provide a voltage drop from the cathodes to the anode upon ignition of two cathodes.

Although the circuits of FIGURES 14, 15, 17, 18 and 19 are all three-phase circuits for connection to three control terminals, they may be easily converted to two-phase circuits operating in substantially the same way for connection to two-phase counters such as shown in FIGURE 13. In each case a portion of the circuit may be eliminated and a shunting connection or connections must be made as shown by dotted lines in FIGURES 14, 15, 17, 18 and 19.

Furthermore the number of phases may be increased by iterating the circuit to connect to more control terminals, if desired, without departing from the principles of the invention.

If the highest number to be counted is not equal to the number of cathodes in the counter tube or is not a whole number multiple of the number of phases of the control circuit employed, several corrective schemes may be empolyed according to the present invention.

Figures 5, 6, 7, 8, 9:
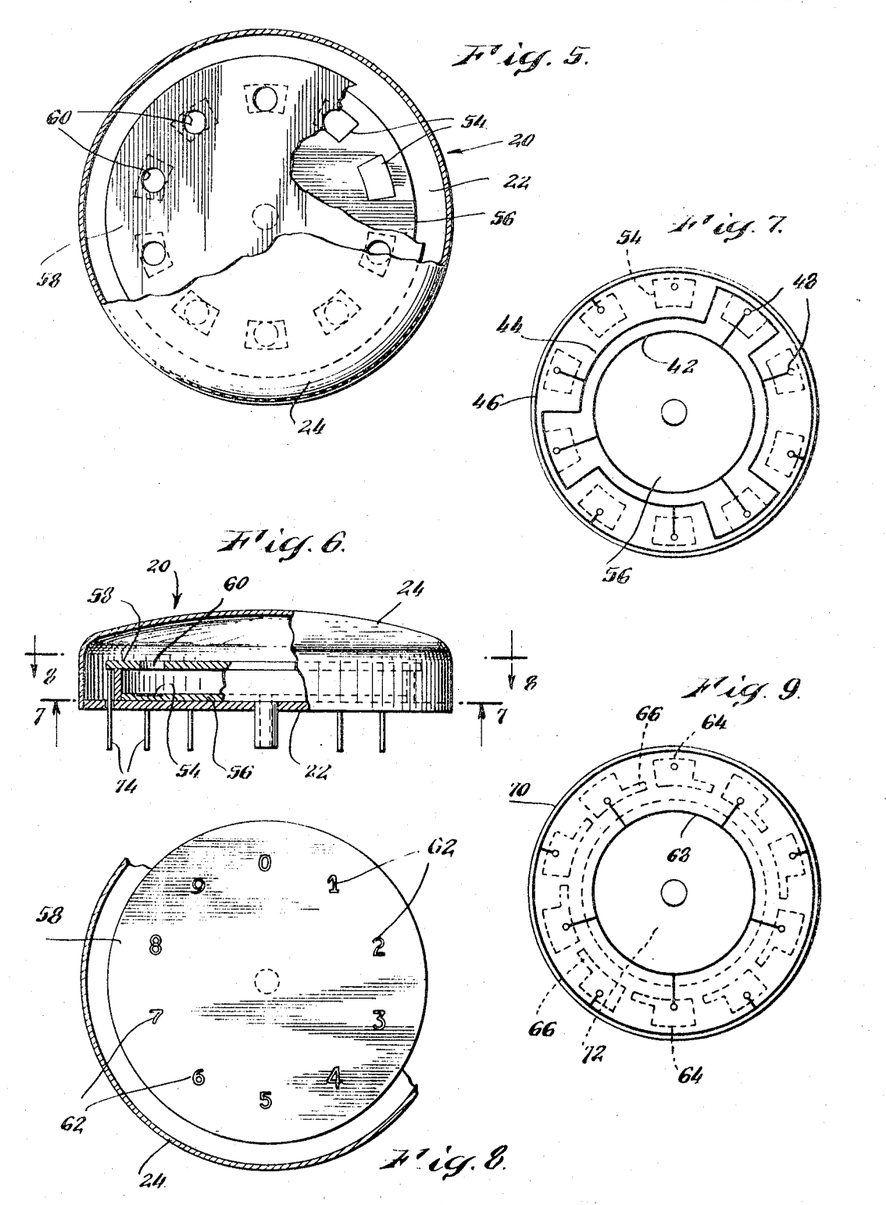
FIGURE 5 is a top view similar to FIGURE 1 of another counter tube according to the present invention.
FIGURE 6 is a simplified side view, partially cut away, of the counter tube of FIGURE 5.
FIGURE 7 is a bottom plan view of the cathode substrate taken along the line 7—7 of FIGURE 6.
FIGURE 8 is a fragmentary cross-sectional view of a modified counter tube, similar to the counter tube of FIGURE 5, as taken along the line 8—8 of FIGURE 6.
FIGURE 9 is a bottom plan view of the cathode substrate similar to FIGURE 7, of a modified counter tube as taken along the line 7—7 of FIGURE 6.

For example, if it is desired to count to ten, the simplest sysem is a counter tube employing ten asymmetrical cathodes connected in a two-phase circuit as shown in FIGURE 13. A specific counter tube for this is shown in FIGURE 9.

One way to count to ten using a three-phase counter tube employing twelve cathodes is shown in FIGURE 21. A three decade counter for counting to a thousand comprises decades 136, 138 and 140. Each of the decades are structurally indentical to the circuit shown for decade 136. The general principle of this system is as follows: After the receipt of nine counts, the nine cathode is glowing. Upon receipt of the tenth or zero count, flip-flop A supplies a pulse to terminal I to cause the X cathode to glow. This causes a signal to be supplied through diode $D_{X2}$, OR gate 148 and OR gate 150 as a second count signal to the ring counter 88. This causes flip-flop B to supply a switching signal to terminal II, thus causing cathode Y to glow. In the same way, this causes a signal to be produced passing through diode $D_{Y2}$, OR gate 148, and OR gate 150 to again cause ring counter 88 to switch and cause the zero cathode to glow. Thus, in response to a single unit input count, the glow is switched from the 9 to the X to the Y to the zero cathode. The glow across one of these cathodes, for example, the Y cathode, as shown, is used to supply an output pulse to the next stage 138 as a unit count therefor.

Figure 23:
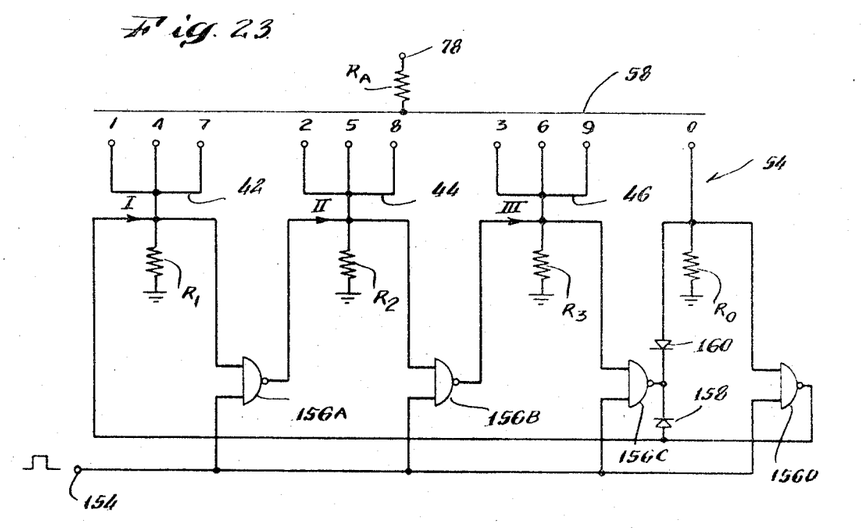
FIGURE 23 is a logic block diagram of another alternative control circuit employing active elements as shown in FIGURE 11, the counter tube being shown schematically.
Figure 24:
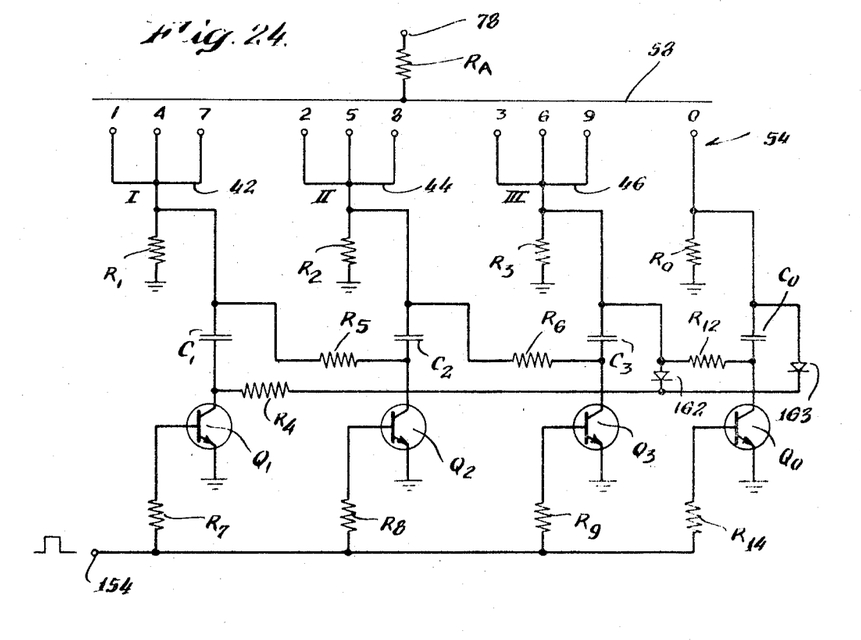
FIGURE 24 is a schematic circuit diagram of a particular circuit operating in the logical manner of the circuit shown in FIGURE 23, the counter tube being shown schematically.

Another system for counting to ten by a three-phase circuit is shown in FIGURES 23 and 24. Only ten cathodes are employed in the counter tubes for these circuits as illustrated in FIGURES 5, 6, 7 and 8. As best seen in FIGURE 23, the tenth or zero cathode is not connected to any of the control buses. When the ninth cathode is glowing, a unit count signal at control terminal 154 will pass through AND gate 156C and initiate a glow at cathode 0. When cathode 0 is glowing, receipt of a unit count will be able to pass through AND gate 156D to initiate a glow at cathode 1 connected to terminal I. This system is advantageous over that shown in FIGURE 21 in that the glow need not be switched to an intermediate cathode in response to a single count as in the circuit of FIGURE 21. In certain circumstances this may result in the possibility of a higher maximum counting speed.

SPECIFIC DESCRIPTION

Counter tubes

More specifically, and referring to FIGURES 1, 2, 3 and 4 an electronic counter tube 20 according to the invention comprises a ceramic base 22 and a transparent glass cover 24 containing a gas mixture suitable for supporting a glow discharge. A plurality of strip-like glow cathodes 26 are deposited on a ceramic substrate 28 by conventional printed circuit techniques. Cathodes 26 are approximately 2½″ long and 1.5 millimeters wide. At their closest approach near the center of the substrate 28, they are spaced 1.5 millimeters apart. These cathodes 26 are twelve in number for adapting the counter to timekeeping systems.

Figures 1, 2:
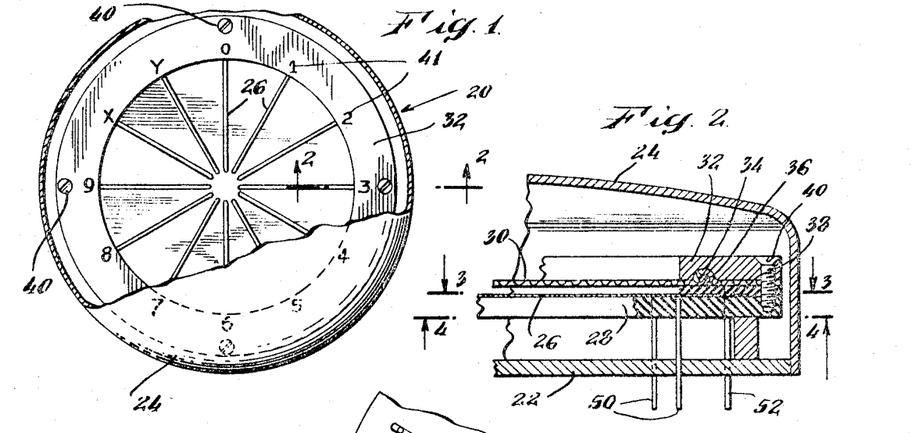
FIGURE 1 is a top view, partially cut away, of a counter tube according to the present invention suitable for timekeeping.
FIGURE 2 is an enlarged fragmentary cross-sectional view taken along the line 2—2 of FIGURE 1.

A common metallic screen anode 30 is spaced 1.5 millimeters above the cathodes 26. The assembly for suspending the screen anode 30 above the cathodes 26 comprises a brass ring 32 having an annular groove 34. A metallic ring 36 fits within groove 34 and stretches the screen 30 taut during assembly. The 1.5 millimeter spacing above the cathodes 26 is provided by a ceramic spacer ring 38. The entire assembly is clamped to the substrate 28 by means of four screws 40.

The ring 32 may have indicia 41 cut or printed thereon to identify the cathodes 26.

Figures 3, 4:
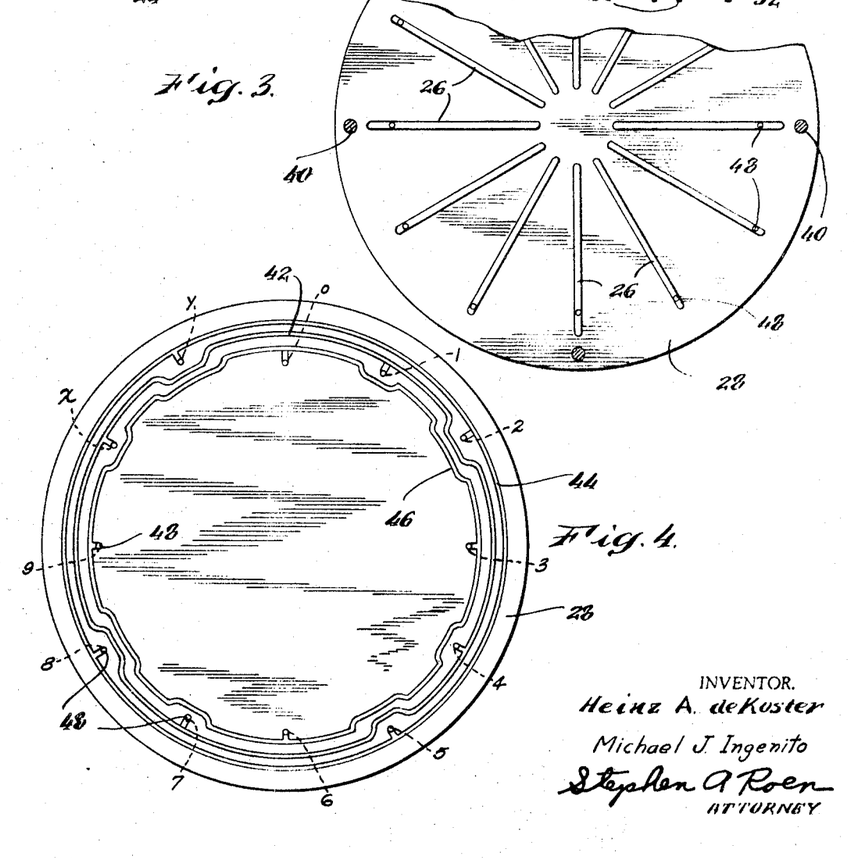
FIGURE 3 is a reduced fragmentary cross-sectional view taken along the line 3—3 of FIGURE 2.
FIGURE 4 is a reduced cross-sectional view taken along the line 4—4 of FIGURE 2.

Except for the zero, X and Y cathodes, every third cathode 26 is connected to one of three common buses 42, 44 and 46 printed on the back of substrate 28 (FIGURE 4). These connections are effected by printed through connections 48 as shown (corresponding cathode positions are indicated by broken lines in FIG. 4). Buses 42, 44 and 46 are connected to feedthrough pins 50 passing through the base 22 of the counter tube 20. Screen anode 30 is similarly conected to feedthrough pin 52 and the zero, X and Y cathodes are connected to individual feedthrough pins (not shown).

The cathode electrodes 26 may be of copper or molybdenum or other materials known in the art for glow discharge tubes. The tube may be filled with a mixture compatible with the cathode metal to provide the desired operating voltages. For example, it may be filled with argon at a pressure of 40 to 50 torr or neon at a pressure of 60 millimeters of mercury.

The counter tubes of the present invention may take various other forms. For example, the counter tube of FIGURES 5, 6 and 7 comprises a glass envelope 24 and a ceramic base 22. It has ten arcuate sector shaped cathodes 54 printed on a ceramic substrate 56. All but one of the cathodes 54 are connected to three buses, 42, 44 and 46, every third cathode being connected together at printed through contacts 48.

The anode 58 is a solid metal element having holes 60 cut therein above the cathodes 54. The holes 60 may be circular as shown in FIGURE 5, may be shaped like the hands of a clock or may be shaped as indicia 62, as shown in FIGURE 8.

In an alternative embodiment of the invention, shown in FIGURE 9, the cathodes 64 are provided with directors 66 and are connected to two buses 68 and 70, every second cathode except the zero cathode being connected to the same bus. The directors 66, as is well known in the art, cause the nearest cathode counterclockwise of a burning cathode as seen in FIGURE 9 to be more primed than cathodes clockwise of a burning cathode such that the glow may be switched from cathode to cathode in the counterclockwise direction as seen in FIGURE 9 by means of a two-phase circuit. This will be further explained below.

A common anode for the cathodes 64 may be provided by a screen 30, as shown in FIGURE 2, by a plate 58, as shown in FIGURES 5, 6 and 8; alternatively, a flat printed anode 72, as shown in FIGURE 9, may be printed in the same plane as the cathodes 64 on the ceramic substrate.

In the embodiments of the invention shown in FIGURES 5 through 9, external connections to the common buses 42, 44 and 46, 68 and 70, to the anodes 58 and 72 and to the zero cathodes 54 and 64 are made by means of feedthrough pins 74 (FIGURE 6).

Counting tubes for use with the control circuits of the present invention may also be manufactured in the same manner as the Dekatron tubes of the prior art.

Control circuits

The control circuits of the present invention may be understood with reference to FIGURES 10 through 13. When the cathodes 26 are connected to three buses 42, 44 and 46, they present three control terminals I, II and III. The common anode, for example, anode 30, is connected through a resistor $R_A$ to a source of positive potential (not shown) at terminal 78. Each of the terminals I, II and III is connected to a source of negative potential (not shown) such that the voltage between anode 30 and all cathodes 26 is sufficient to maintain a glow discharge at any one of the cathodes 26 as indicated by the horizontal line portions of the voltage waveforms $a$, $b$ and $c$. In response to each unit count signal, a control circuit connected to terminals I, II and III supplies to one of them in rotation a negative pulse. This increases the potential between the cathodes 26 connected thereto and the anode 30 to a level sufficient to initiate a glow discharge at a cathode connected thereto next adjacent to a cathode at which a glow discharge is then occurring or has just occurred. This increase in potential is not sufficient to initiate a discharge at an unprimed cathode. The voltage waveforms applied to the control terminals I, II and III are indicated at $a$, $b$ and $c$ in the timing diagram to the left in FIGURE 10; the unit count signals are assumed to be received at times $T=1$, 2, 3, etc. The vertical dotted lines indicate that the unit count signals ned not be received at fixed time intervals but may occur randomly.

In order to more fully understand the invention, assume, for example, that a glow discharge exists at cathode 5. This discharge continues because the potential normally applied at terminal II is precisely the maintaining voltage with respect to the anode 30. Another way to conceive of this is that the control circuit connected between terminal 78 and terminal II is capable of supplying current through the circuit sufficient to maintain the glow discharge when the voltage between cathode 5 and anode 30 is clamped at the maintaining voltage, a characteristic of the counting tube itself. Similarly, the circuits connected between terminals I and III and terminal 78 are sufficient to supply current to maintain a glow discharge at any glowing cathode connected thereto.

At time $T=6$ a unit count pulse is received. The control circuit in response thereto applies a negative pulse to control terminal III. This negative pulse is sufficient to increase the potential difference between the cathodes 3, 6, 9 and 12 and anode 30 to the characteristic transfer voltage of the tube. This voltage is less than the breakdown voltage, that is, the voltage at which a glow may be initiated between a cathode 26 and the anode 30 when no glow discharge exists in the tube. Thus, no glow discharge is initiated at cathodes 3, 9 and 12. However, cathode 6 has been primed. That is, stray ions are present between cathode 6 and anode 30 and the breakdown potential therebetween is lowered to the transfer voltage. Thus, a glow discharge will begin between cathode 6 and anode 30.

This increases the current through resistor $R_A$. The increase in current in resistor $R_A$ increases the voltage between terminal 78 and anode 30, thus decreasing the potential between anode 30 and the cathodes 26. In the case of all cathodes connected to buses 42 and 44, and in particular cathode 5, this potential is now less than the maintaining voltage and the glow discharge at cathode 5 terminates. The glow discharge at cathode 6 does not terminate because the negative pulse at time $T=6$ is still being applied thereto. It will be understood by those skilled in the art that the negative pulse at time $T=6$ must, therefore, exist for longer than the deionization time between anode 30 and cathode 5 in order to sustain the newly initiated glow discharge at cathode 6 until the possibility of re-establishing a glow discharge at cathode 5 has been eliminated.

Thus, the glow discharge may be transferred to a next adjacent cathode to that at which a glow discharge previously occurred in response to a unit count to indicate receipt of a unit count.

The counter tube may be made to count backwards or to subtract by applying the negative switching signals to the terminals I, II and III in the opposite rotative order, i.e. instead of applying them to terminals I, II, III, I, II, etc., applying them to terminals III, II, I, III, II, etc.

The control circuits of the invention may be provided with active elements as in control circuit 80 of FIGURE 11 or they may be provided with only passive elements as in the control circuit 82 of FIGURE 12.

Those skilled in the counter tube art will understand that the number of circuits (i.e. the phases of the overall circuit) to which the cathodes 26 are connected may be increased to more than three in number without departing from the scope of the invention.

When the counter tube comprises asymmetrical cathodes, such as cathodes 64 having directors 66 illustrated in FIGURE 9, or cathodes oriented in skewed planes or formed of two areas of dissimilar metals, two-phase circuits may be employed as illustrated in FIGURE 13. Here the asymmetrical cathodes 64 are indicated by arrows. The two buses, for example buses 68 and 70 of FIGURE 9, are connected to two control terminals I and II. These are supplied in rotation with negative signals on receipt of unit count pulses and are otherwise biased at the maintaining voltage characteristic of the tube as indicated at $a$ and $b$ in the timing diagram toward the left of FIGURE 13.

Assuming that cathode 5 has a glow discharge thereat, the $T=6$ negative pulse will be applied through terminal II to bus 70. The voltage which it is necessary to apply between anode 76 and cathode 4 for initiation of a glow discharge is greater than the voltage that need be applied between anode 76 and cathode 6 because of the asymmetry of the cathodes. The negative pulse applied to terminal II is small enough so that the potential between cathode 4 and anode 76 does not reach that required to initiate a glow discharge and great enough to initiate a glow discharge at cathode 6. In this manner, the glow discharge will be initiated at cathode 6. The existing glow discharge at cathode 5 is terminated by means of the increased voltage drop across anode resistor $R_A$ in the manner previously described with reference to FIGURE 10.

A ring counter control circuit

A ring counter control circuit for operating a three-phase counter tube in accordance with the present invention is shown in FIGURE 14. This is the same three-phase circuit disclosed in the above-identified co-pending application, Ser. No. 524,027.

The circuit of FIGURE 14 may be employed to control any three-phase counter tube according to the invention and in particular the counter tube of FIGURES 1 through 4. When used with the control circuit illustrated in FIGURE 14, which is an example of a control circuit with active elements (FIGURE 11), the X and Y cathodes of the counter tube 20 (FIGURE 1) are connected to control terminals I and II respectively. The zero cathode is connected through a diode 84 to control terminal III. Each of the control terminals is connected to ground through one of three cathode resistors, 86A, 86B and 86C.

The values of anode resistor $R_A$ and cathode resistors 86 are chosen along with the supply voltage applied at terminal 78 such that a glow discharge existing on any cathode within the glow discharge tube will be maintained. Switching is controlled by a three-phase ring counter generally indicated at 88. This comprises three stages identical to the stage 90 indicated by dotted lines. The stages are commonly connected to ground through a network comprising resistor 92, inductor 94 and diode 96. They are responsive to unit count signals at terminal 98 applied across resistor 100 connected to ground. In response to each unit count signal (a positive pulse) at terminal 98, ring counter 88 switches to supply the negative signals indicated in FIGURE 10 in rotation to the control terminals I, II and III.

The circuit of FIGURE 14 may be modified for controlling a two-phase counting tube as show in FIGURES 9 and 13 by eliminating the third stage 90 of the ring counter and making the shunt connections 102 and 104 as shown. The operation of the two-stage control circuit is, except for the number of phase signals provided and the number of control terminals, identical to the three-phase system. It would be obvious to those skilled in the art that more stages, constructed as stage 90, may be added in a similar manner to drive counter tubes having more than three phases (i.e., control terminals).

A glow discharge is initiated at the zero cathode by applying a potential equal to the breakdown potential between the zero cathode and the anode 30 at terminal 106. This negative potential at terminal 106 is blocked by diode 84 and does not affect the ring counter 88. When the counter has counted to twelve, the existence of the glow discharge at the zero cathode provides a positive signal at terminal 106 which serves as the output of the counter tube and may be supplied to another counter tube stage.

And now describing the ring counter 88 in detail:

Ring counter 88 is essentially conventional. It comprises silicon controlled rectifiers (hereinafter called SCR's) $Q_A$, $Q_B$, and $Q_C$ which may be GE type 6CF. Each SCR has a plurality of electrical elements connected in circuit therewith having identical values and functions. These elements are given the same reference number herein followed by an A, B or C identifying the associated SCR having the same subscript. A resistor 184 is connected between the cathode and the gate of each SCR. The anode of each SCR is connected through a resistor 186 to terminal 108 which is at 40 volts positive potential.

The anode of each SCR is connected through a capacitor 188 to ground. The anode of each SCR is connected to the gate of each succeeding SCR through a resistor 190 and a capacitor 192 connected in series. The connecting terminal between each resistor 190 and capacitor 192 is connected through a diode 194 to terminal 98.

Each of the SCR's, during its switching operation, supplies a signal to a control terminal I, II, or III through a network comprising a capacitor 204 connected in series with a diode 206 and resistor 208 connected in parallel.

The SCR's $Q_A$, $Q_B$, and $Q_C$ are connected such that one of them must be in the conducting state at all times. Assuming that SCR $Q_B$ is conducting, there is essentially no voltage across its cathode to anode junction. The values of the resistances in the network are chosen such that the potentials of the gates of the SCR's $Q_A$, $Q_B$, and $Q_C$ are positive enough for them to fire and $Q_B$ remains conducting.

The positive unit count pulses at terminal 98 are applied to steering diodes 194. Diodes 194A and 194C are back biased by the positive potential at the anodes of $Q_A$ and $Q_C$. Diode 194B is, however, forward biased by the essentially ground potential at the anode of $Q_B$. Thus, a positive pulse at terminal 98 will not pass through the steering gate of diodes 194A or 194C to positively bias the gates of $Q_B$ or $Q_A$ but will pass through diode 194B to positively bias the gate of $Q_C$, which thereupon fires. The anode of $Q_C$ thereupon goes to approximately ground potential. This negative pulse at the anode of $Q_C$ is supplied through the capacitor 204C and diode 206C to terminal 46 to fire the primed cathode connected thereto.

When SCR $Q_C$ turns on, the cathode thereof instantaneously goes to a positive potential. The forward bias across $Q_B$ is thus removed. This turns off $Q_B$ so that it assumes its non-conducting state.

Similarly, if $Q_A$ is conducting, a pulse applied to terminal 98 will fire $Q_B$ and if $Q_C$ is conducting, a pulse applied to terminal 98 will fire $Q_A$. In this way a negative glow switching signal is applied cyclicly to the control terminals I, II, III.

The values and types of components employed in the ring counters 48 are as follows: All diodes are type 1N462. Inductor 94 is wound on a Magnetics 55118 core and employs 1200 turns of No. 36 wire. Resistors 184 are 1 kilohm; resistors 186 are 1.8 kilohms; resistors 190 are 18 kilohms; resistor 100 is 47 kilohms; resistor 192 is 270 ohms; resistors 208 are 47 kilohms, Resistors 186 are 2 watt resistors. All other resistors are ½ watt resistors. Capacitors 188 are 0.1 microfarad; capacitors 192 are .0047 microfarad; capacitors 204 are 0.1 microfarad. All capacitors are rated at 100 volts.

Resistors 86 and anode resistor $R_A$ are chosen to provide the required maintaining voltage for the cathode-anode spacing. In the specific embodiment of the above-identified application, Ser. No. 524,027, resistors 86 are 3.3 kilohm 1 watt resistors and resistor $R_A$ is an 82 kilohm 2 watt resistor.

Terminal 78 is connected to a source of 400 volts positive potential. Assume that a cathode connected to terminal II is glowing. The potential between anode 30 and terminal II will then always be 230 volts. Anode resistor $R_A$ and cathode resistor 86B have been chosen to have values which limit the current of the glow discharge as is conventional in the glow discharge art. In the embodiment disclosed in the above-identified application, the transfer voltage is approximately 265 volts.

The transfer potentials are supplied by ring counter 88. Note that there is a large capacitance, comprising capacitors 188 and 204 across each cathode resistor 86. This capacitance insures that the potential at a glowing cathode cannot change rapidly. When a cathode connected to terminal II is glowing and it is time to switch to the next adjacent cathode connected to terminal III, ring counter 88 supplies a negative 40 volt signal to terminal III. All cathodes connected thereto thus have a potential with respect to the anode 30, five volts above the required transfer voltage of 265 volts. However, only that cathode adjacent to the already glowing cathode connected to terminal II will begin glowing. Then a large additional current flows through anode resistor $R_A$. This drops the voltage at anode 30. The capacitance connected across resistor 86B insures that the cathode potential does not change. Since the anode potential has dropped, the maintaining voltage is no longer applied between the previously burning cathode and anode 30 and the glow thereat is turned off. The negative signal supplied to terminal III, of approximately 40 volts, is large enough to keep the adjacent cathode connected thereto glowing during this switching operation and it will remain glowing.

In order for the counter to operate properly, the ring counter 88 must be synchronized with the initial glow at the zero cathode. Various ring counter preset circuits of the prior art may be used for this purpose. A particular preset circuit is disclosed in the above-identified co-pending application, Ser. No. 524,027.

Passive control circuits

Figure 16:
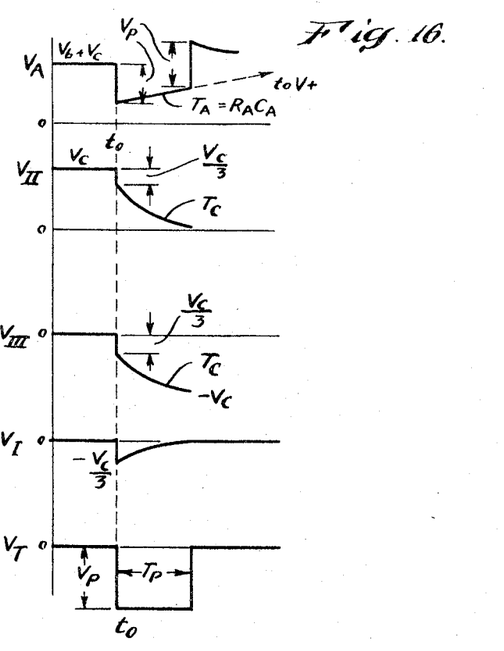
FIGURE 16 is a timing diagram showing the operation of the circuit of FIGURE 15.

Control circuits using only passive elements for controlling the switching of the glow discharge are shown in FIGURES 15 and 17. FIGURE 16 is a detailed timing diagram illustrating the operation of the circuit of FIGURE 15.

In circuits employing only passive elements the memory for indicating the next control terminal to which the transfer voltage is to be applied is supplied by the counter tube itself. Thus, for example, referring to FIGURE 15, a circuit is shown wherein an existing glow discharge is terminated before the glow discharge at a next adjacent cathode is initiated. If a glow discharge exists on a cathode connected to control terminal II, the control circuit generally indicated at 110 will operate such that the next unit count signal causes the transfer voltage to be applied to control terminal III.

As in the previously described circuits, anode 30 is connected through anode resistor $R_A$ to a source of positive potential (not shown) at terminal 78. Each of the control terminals I, II and III is connected to ground through a separate cathode resistor $R_1$, $R_2$, and $R_3$, respectivly. This connection is effected through a respective diode $D_1$, $D_2$, and $D_3$. A capacitor $C_1$ is connected at one terminal to a point between diode $D_1$ and resistor $R_1$ and at the other terminal to control terminal II. Capacitors $C_2$ and $C_3$ are similarly connected as shown. Unit count signals in the form of negative pulses of $-V_p$ volts are applied for a time $T_p$ to input terminal 112, and thus through coupling capacitor $C_A$ to anode 30.

The operation of control circuit 110 can be understood generally as follows: Assume that a glow discharge is occurring at a cathode connected to control terminal II. The potential existing between anode 30 and control terminal II, $V_b$, will be the maintaining voltage. A current $I_b$ will be flowing from the anode 30 to the control terminal II and through diode $D_2$ and resistor $R_2$ to ground. This will cause capacitors $C_1$ and $C_2$ to charge, as shown. There will be no charge on capacitor $C_3$ since no current will be flowing through diode $D_3$ and resistor $R_3$.

The negative unit count pulse supplied to terminal 112 reduces the voltage between anode 30 and control terminal II to below the maintaining voltage and the glow discharge is extinguished. Capacitor $C_2$ will not be able to discharge because of the blocking action of diode $D_3$. However, capacitor $C_1$ will be able to discharge through diode $D_2$. This will cause the potential at terminal I to drop slightly below ground potential and then gradually return to ground potential. Simultaneously the potential at terminal II will slowly decrease from a potential above ground to ground potential. Also simultaneously, the potential at control terminal III will fall from ground potential to the potential $V_c$ across capacitor $C_2$.

This will result in the glow being transferred to an adjacent cathode connected to control terminal III, if the values of the elements are suitably chosen. The potential difference between anode 30 and the cathodes connected to control terminal III can be made to exceed the transfer voltage while the potential difference between control terminal I and anode 30 is kept below the transfer voltage. Similarly, the potential between anode 30 and the cathodes connected to control terminal II must be kept below that required for re-ignition, that is, a potential somewhat less than the transfer voltage.

Upon the application of another negative unit count pulse at terminal 112, the glow will be switched to the next adjacent electrode which is connected to control terminal I. The next negative unit count pulse will step the glow to next adjacent electrode coupled to control terminal II and so on.

It will be thus seen that each stage 114, as indicated by the dotted box, of the passive control circuit 110 comprises identical elements. One stage may be eliminated and shunt connection 116 may be made to convert the circuit to two-phase operation for driving two-phase counter tubes having asymmetrical cathodes as illustrated in FIGURES 9 and 13.

A more detailed description of the circuit of FIGURE 15 is as follows: Referring to FIGURES 15 and 16, assume one of the cathodes connected to terminal II is glowing. The cathode to anode current is $I_b$. The capacitors are charged as shown. The negative unit count pulse $V_p$ is then applied to terminal 112. The leading edge of $V_p$ causes the anode to cathode voltage, $V_b$, and the anode voltage, $V_A$, to drop because $I_R R_A$ increases and cathode II is held at voltage $V_c$ with respect to ground by $C_1$. Lowering $V_b$ terminates the discharge. If $V_p$ is negative enough (at least 20 volts), the glow is extinguished in a very short time. Let us assume that it is instantaneous, therefore at $t_0$, corresponding to the leading edge of $V_p$— the gas starts to deionize and $C_1$ starts to discharge. Analyzing the discharge circuit, it can be shown that $D_3$ remains back biased and capacitor $C_2$ holds the voltage $V_c$. The charging time constant of the anode circuit is $T_A = R_A C_A$. Assuming that $T_p$ (the duration of $V_p$) and $T_A$ are about 5 times the discharge time constant in the cathode circuit $T_C$, the voltage waveforms of the anode, and control terminals I, II and III with respect to ground are approximately as shown in FIGURE 16 at $V_I$, $V_{II}$, and $V_{III}$.

By the end of $T_p$, $V_I$ and $V_{II}$ are at zero volts and $V_{III}$ is at $-V_C$. The question that now arises is whether the $-V_C$ bias on terminal III is sufficient to prevent the previously glowing cathode connected to terminal II from re-ionizing and to cause the next adjacent cathode connected to terminal III to start glowing. In other words, even though terminal III has a negative bias over terminal II, it is at a cathode connected to the terminal II where most of the ions existed at the start of the deionization. At a given time later we would still expect more ions to exist at that cathode than at the next adjacent cathode. Therefore, one condition for good switching is that terminal III must be negative enough to overcome this "ion bias." Another condition is that the deionization time should be long compared to $T_p$ or else any cathode on bus III might come on next. The final condition is that $V_c$ should be small enough so that in the quiescent condition (when the glow is not being switched), the anode voltage $V_A = V_B + V_C$ does not get above the transfer voltage of the adjacent cathodes which are being primed by the discharge, and $T_p$ should be shorter than the ionization time for a primed cathode. As ionization times are generally about 10 microseconds and deionization times may be as short as 100 microseconds, $T_p$ in general should be approximately 50 microseconds in duration in most applications.

The above-described circuit may be utilized with copper electrodes 2 millimeters from a common anode, spaced 2 millimeters apart at their closest approach and all printed on a glass epoxy substrate in argon gas at 30 millimeters of mercury pressure. In this case, the breakdown voltage is approximately 300 volts, the transfer voltage 220 volts, and the maintaining voltage 200 volts. $T_p$ may then be as long as 200 microseconds. The voltage supplied at terminal 78 is 400 volts. Resistor $R_A$ is 33 kilohms, resistors $R_C$ are 5.6 kilohms, capacitor $C_A$ is .006 microfarad, capacitor $C_1$, $C_2$ and $C_3$ are each .004 microfarad, and diodes $D_1$, $D_2$ and $D_3$ may be Sylvania type 1N2070A. The circuit may be connected to a counter tube having twelve cathodes 26 as illustrated in FIGURES 1 through 4 wherein the X and Y cathodes are connected to control terminals I and II, respectively, and the zero cathode is connected through a diode (not shown) to control terminal III. In this case all twelve cathodes would be display or count cathodes.

Another control circuit 118 employing only passive elements is illustrated in FIGURE 17. This circuit initiates the glow discharge at the next adjacent cathode before turning off the discharge at the prior cathode. This is accomplished by selective voltage biasing at the control terminals I, II and III, depending on which one is connected to a cathode supporting a glow discharge. A negative unit count signal applied to terminal 120 causes the proper control terminal to be biased negative enough to exceed the transfer voltage.

For example, assume that a discharge is occurring between anode 30 and a cathode connected to control terminal II. Due to the diodes $D_1$, $D_2$ and $D_3$, the potential with respect to ground at terminal II, will be greater than that at terminal I which, in turn, will be greater than that at terminal III. The negative pulse applied at terminal 120 will reduce the potential at each of the control terminals by the same amount. If the values of the elements in the circuit are chosen properly, the net effective potential at terminal III with respect to anode 30 during the unit count pulse may be made greater than the transfer voltage while the net effective potential between anode 30 and terminals I and II remain below the transfer voltage. Thus, a glow may be initiated at a next adjacent cathode connected to terminal III. Initiation of this glow discharge increases the current through anode resistor $R_A$ and thus decreases the potential between anode 30 and the cathodes connected to control terminal II to below that required to sustain a discharge to thus discontinue the original discharge. It will be obvious to those skilled in the art that reversal of the polarity of the diodes $D_1$, $D_2$ and $D_3$ by reversing the voltage biasing on terminals I, II and III reverses the direction in which the counter tube connected to the circuit 118 is driven.

If control circuit 118 of FIGURE 17 is connected to a counter tube as described with respect to the circuit 110 of FIGURE 15, the supply voltage at terminal 78 may again be 400 volts and the unit count signal of the order of 30 volts. Resistor $R_A$ may be 6.8 kilohms, resistors $R_1$, $R_2$ and $R_3$ 2.7 kilohms, resistors $R_{C1}$, $R_{C2}$ and $R_{C3}$ 12 kilohms, capacitors $C_1$, $C_2$ and $C_3$ 0.1 microfarad, and diodes $D_1$, $D_2$ and $D_3$ Sylvania type 1N1692.

Again it will be seen that the control circuit 118 comprises three identical circuits each connected to one of the control terminals I, II and III; the circuit 122 connected to control terminal III being indicated by the dotted box. This third phase 122 may be eliminated and shunt 124 connected to convert the circuit to two-phase operation for connection to two-phase counter tubes employing asymmetrical cathodes. Additional circuits 122 may be added for controlling four or more phase counters. In order to preserve the voltage biasing effect the circuit must be modified somewhat in the two-phase case by correcting the capacitors to intermediate points in the resistors $R_{C1}$ and $R_{C2}$ by conductors 125 and 127 and disconnecting them from $D_1$ and $D_2$ at points 129 and 131.

Circuits employing logic elements

Figure 18:
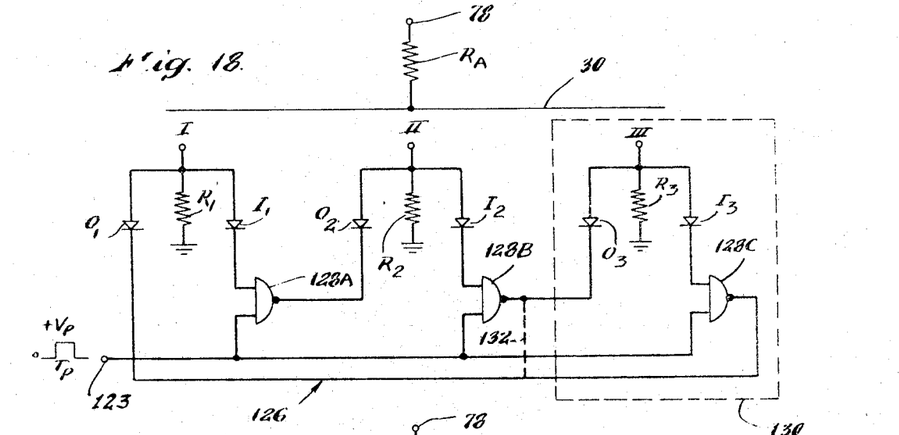
FIGURE 18 is a logic block diagram of an alternative control circuit, the counter tube being shown schematically.

Now referring to FIGURE 18, another type of circuit which utilizes the counter tube itself as the memory element for determining to which control terminal the next transfer voltage signal is to be applied is shown at 126. This circuit may be used with any multiphase counter tubes of the type described herein. It again comprises an anode resistor $R_A$ connected between an anode 30 and a source of positive potential (not shown) at terminal 78. The control terminals I, II and III are each connected to ground through a cathode resistor $R_1$, $R_2$ and $R_3$ respectively. Switching is accomplished by means of logical AND gates 128A, 128B and 128C connected between each of the control terminals I, II and III.

When a discharge exists at any cathode connected to any one of the control terminals, a positive signal is applied to the uppermost input terminal of the AND gate 128 associated therewith through an input diode $I_1$, $I_2$ or $I_3$. The positive unit count pulses are applied at terminal 123 connected to each of the lowermost inputs of AND gate 128A, 128B and 128C. Thus, only that AND gate 128 which is connected to a cathode at which a gas discharge is taking place will produce on output signal in response to a unit count signal at terminal 123. This output signal is applied through the output diode $O_1$, $O_2$ or $O_3$ connected to the next succeeding control terminal. This signal is negative as the AND gates 128A, as indicated by the black dots at their output terminals, are inverter AND gates.

Thus, assuming that a glow discharge exists at a cathode connected to control terminal II, a positive signal will be applied through diode $I_2$ to the uppermost input terminal of AND gate 128B. The positive unit count input signal at terminal 129 will cause AND gate 128B to produce a negative output signal. This negative signal is applied through diode $O_3$ to control terminal III and produces a potential thereat with respect to anode 30 greater than the transfer voltage. This initiates a discharge at the next adjacent cathode connected to control terminal III. The increased current then flowing through anode resistor $R_A$ reduces the anode to cathode voltage at terminal II and terminates the discharge at the cathode connected thereto. In this manner, the discharge may be transferred one cathode at a time in response to each unit count.

Again the control circuit 126 comprises three identical circuits each connected to one of the control terminals I, II or III. The circuit 130 connected to control terminal III is indicated by dotted lines. For two-phase operation, circuit 130 may be eliminated and bus 132 connected. For four or more phase operation additional circuits 130 may be added.

Figure 19:
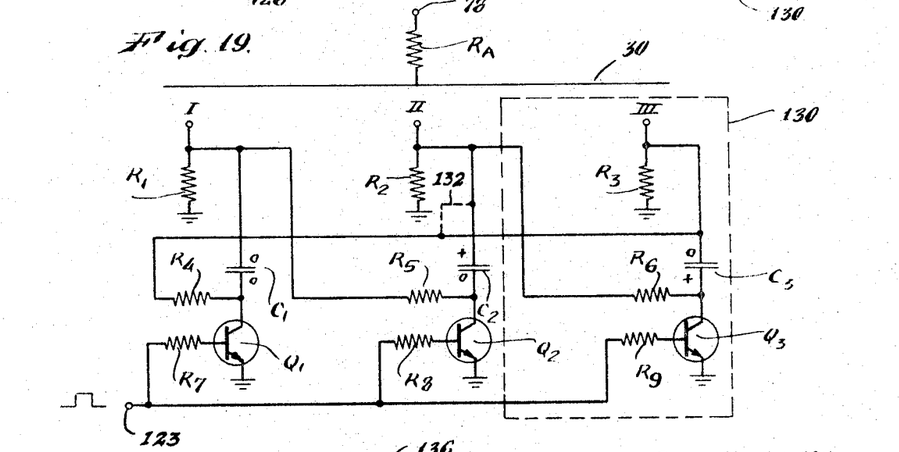
FIGURE 19 is a schematic circuit diagram of a particular circuit operating in the logical manner of the circuit of FIGURE 18, the counter tube being shown schematically.

A practical circuit operating in the logical manner illustrated in FIGURE 18 is shown in FIGURE 19. This circuit has been successfully operated with copper cathodes approximately 3 millimeters wide, 7 millimeters long, circularly spaced about a circular anode in the same plane, the anode being 14 millimeters in diameter, the anode to cathode gap being three millimeters, the cathode to cathode gap at closest approach being three millimeters and the gas being neon at a pressure of 60 millimeters of mercury. In this case, the supply voltage at terminal 78 was 400 volts, anode resistor $R_A$ was 58 kilohms, resistors $R_1$, $R_2$ and $R_3$ were 20 kilohms, resistors $R_4$, $R_5$ and $R_6$ 22 kilohms, resistors $R_7$, $R_8$ and $R_9$ were 1 kilohm, capacitors $C_1$, $C_2$ and $C_3$ were 0.1 microfarad and transistors $Q_1$, $Q_2$ and $Q_3$ were RCA type 2N3440.

The detailed operation of the circuit of FIGURE 19 may be understood as follows: If there is a glow discharge at one of the cathodes connected to control terminal II, capacitor $C_2$ will be charged as shown. The collectors of transistors $Q_1$ and $Q_2$ will be essentially at zero volts potential and the collector of transistor $Q_3$ will be at the positive potential of control terminal II. The unit count pulse supplied to input terminal 123 causes each of the transistors $Q_1$, $Q_2$ and $Q_3$ to conduct. Since the potential across a capacitor cannot change instantaneously and since the collector of transistor $Q_3$ is the only collector to have its potential changed when its transistor begins to conduct, control terminal III will be driven to a negative potential equal to the prior positive potential at control terminal II. Thus, if $R_2$ is chosen properly, so that the voltage at control terminal II is large enough to provide the transfer voltage between anode 30 and control terminal III, the next adjacent cathode connected thereto will begin to glow. The additional current drawn through anode resistor $R_A$ will in a manner similar to that described with reference to the earlier circuits decrease the potential between the anode 30 and the cathode connected to control terminal II to below the maintaining voltage and the glow at the cathode connected thereto will be extinguished.

Multi-stage counters

Figure 20:
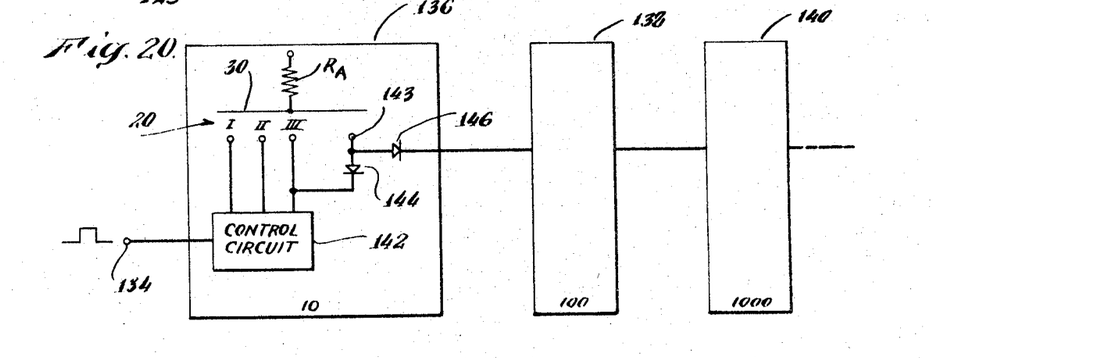
FIGURE 20 is a partially schematic circuit block diagram of a multi-stage counter according to the present invention, the counter tube being shown schematically.

Multi-stage counters may be constructed in the manner illustrated in FIGURE 20. Thus, unit count pulses may be supplied to an input terminal 134 of a first decade 136. The output terminal of decade 136 is connected to the input terminal of a second decade 138 and the output terminal thereof is connected to the input terminal of a third decade 140. Each decade is a tens decade and is capable of counting to ten. Adding decade 138 provides the ability to count to 100, and with decade 140 there is provided the ability to count to one thousand. The number of decades may be increased indefinitely. Each decade employs a counter tube, normally indicated at 20, and a control circuit 142 which may be active or passive. One cathode 143 is connected to its control terminal through a diode 144 and is connected to the output terminal of the decade 136 through a diode 146. Amplifiers may be connected between the decades if required as disclosed in the above-identified application, Ser. No. 524,027.

Three phase ten counters

Special techniques must be employed in order to count to ten with three-phase control circuits or to count to any number not an integral number times the number of phases of the control circuit. Two different schemes for doing this are illustrated in FIGURES 21 and 23. In the circuit illustrated in FIGURE 21 logical OR gates are utilized in order to rapidly switch to the X, to the Y, and then to the zero cathode in response to a tenth unit count signal in counter tubes as shown in FIGURES 1 through 4. It should be noted that in FIGURES 21, 23 and 24, the cathodes are shown schematically not in their lineal order in the counting tube.

Figure 22:
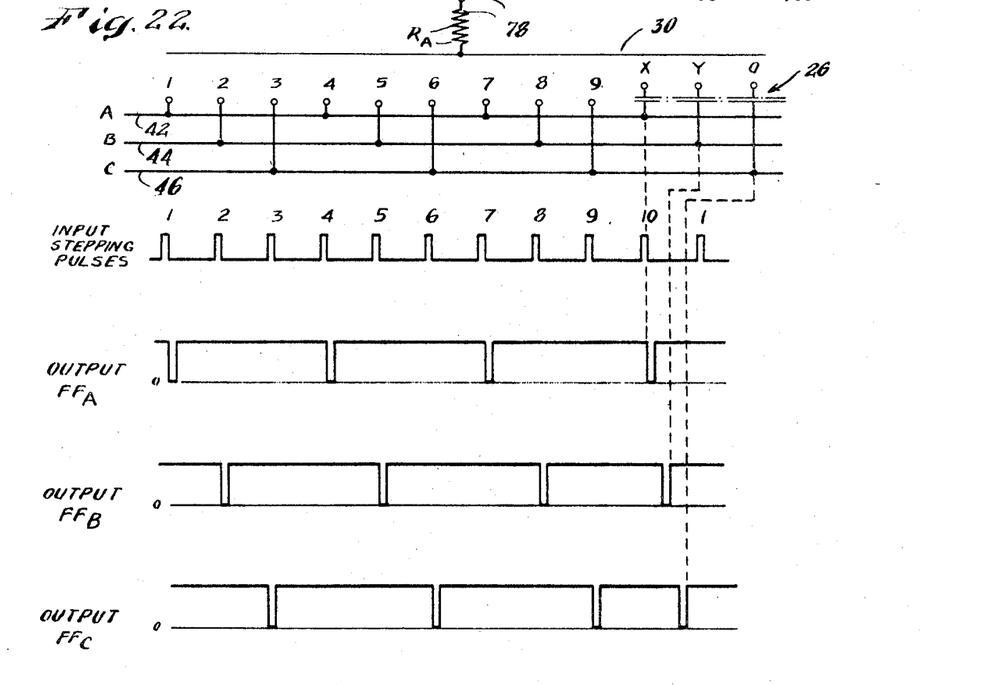
FIGURE 22 is a diagram illustrating the method of operation of the circuit of FIGURE 21.

Specifically referring to FIGURE 21, a three stage counter comprises decades 136, 138 and 140 connected as described with reference to FIGURE 20. The X and the Y cathodes are connected to their control terminals I and II respectively through diodes $D_{X1}$ and $D_{Y1}$ respectively. They are further connected through diodes $D_{X2}$ and $D_{Y2}$ to the input terminals of logical OR gate 148. The output of OR gate 148 is connected as one input to another logical OR gate 150, the second input thereto being connected to unit count input terminal 134. The output of OR gate 150 is connected to input terminal 98 of ring counter 88 constructed in the manner shown in FIGURE 14. Referring now to FIGURES 21 and 22, each unit count signal 1 through 9 applied to terminal 134 will be applied to input terminal 98 of ring counter 88 to switch the glow to the next adjacent cathode. When the 9 cathode is glowing and the unit count signal is received, flip-flop A of ring counter 88 will cause the glow to be switched to cathode X. This will produce a positive signal applied through diode $D_{X2}$, OR gate 148 and OR gate 150 to input terminal 98 of ring counter 88. It immediately switches again to switch the glow to cathode Y. This causes a positive signal to be applied through diode $D_{Y2}$ through OR gate 148 and 150 to terminal 98 to again switch the ring counter 88 to cause the glow to be switched to the zero cathode. Thus, in response to the tenth unit count input at terminal 134, the glow discharge has been switched from the nine cathode to the zero cathode. The output signal, indicating a count of ten, may conveniently be taken off the Y cathode through diodes $D_{Y2}$ and 152 and is supplied to the input terminal of the next decade 138.

A timing diagram illustrating the operation of the circuit of FIGURE 21 is shown in FIGURE 22.

Another scheme for counting to ten with a three-phase control circuit is shown in FIGURE 23. This circuit is suitable for use with counting tubes having ten cathodes connected into a three-phase circuit such as that illustrated in FIGURES 5 through 8. The anode 30 is connected through anode resistor $R_A$ to a source of positive potential (not shown) at terminal 78. All cathodes except for the zero cathode are iteratively connected to control terminals I, II and III. They are in turn connected to ground through resistors $R_1$, $R_2$ and $R_3$. The zero cathode is separately connected through resistor $R_0$ to ground. Positive unit count input pulses are applied at input terminal 154 and from there as one input to each of four logical inverter AND gates 156A, 156B, 156C and 156D.

In counting from one to nine, the circuit operates in the same manner as previously described with reference to the circuits shown in FIGURES 18 and 19. When a glow discharge exists at a cathode connected to the III control terminal, the negative output signal from AND gate 156C passes through a diode 158 to be applied to control terminal I. However, the signal is also applied through diode 160 to the zero cathode. However, a discharge will not be initiated at the zero cathode when the discharge previously existed at the 3 or 6 cathode because the zero cathode is not next adjacent to the 3 or 6 cathode. However, when the previous glow discharge exists at the 9 cathode, the zero cathode will be next adjacent and will ignite. The 1 cathode will not ignite because it is far enough away from the 9 cathode (the 0 cathode being between them) that the breakdown voltage of the 1 cathode is greater than the transfer voltage of the 0 cathode.

The ignition of a discharge at the zero cathode will extinguish the discharge at the 9 cathode in the usual way by increasing the current through the anode resistor $R_A$. The next unit count pulse will be passed by AND gate 156D due to the existence of the glow at the zero cathode and the transfer pulse will be applied to control terminal I to initiate the glow at the 1 cathode.

A specific circuit constructed in accordance with the logical principles illustrated in the circuit in FIGURE 23 is shown in FIGURE 24. It is very similar in structure and operation to the circuit of FIGURE 19 previously described and may be used with a ten cathode counting tube constructed with the dimensions and materials described with reference to FIGURE 19. Thus, transistors $Q_0$, $Q_1$, $Q_2$ and $Q_3$ may be RCA type 2N3440, resistors $R_0$, $R_1$, $R_2$ and $R_3$ may be 20 kilohms, anode resistor $R_A$ may be 58 kilohms, the potential at terminal 78 may be 400 volts positive with respect to ground, capacitors $C_0$, $C_1$, $C_2$ and $C_3$ may be 0.1 microfarad, resistors $R_4$, $R_5$, $R_6$ and $R_{12}$ may be 22 kilohms, resistors $R_7$, $R_8$, $R_9$, and $R_{14}$ may be 1 kilohm, and the unit count pulse supplied to terminal 154 may be a 5 volt positive signal having a duration of 1.5 milliseconds, diodes 158 and 160 both being Sylvania type 1N2070A, diodes 162 and 163 being Sylvania type 1N2070A.

It will be understood that the term "multi-phase" circuit as used herein, refers to a circuit for applying a given electrical signal cyclically or repetitively to multiple cathode input terminals, representing multiple cathode groups, in sequence so as to step the glow discharge along successive cathodes. Thus, in the illustrative "three-phase" circuit described above, the electrical input signal is cyclically or repetitively applied to the three cathode groups represented by input terminals I, II, and III in sequence. In the illustrative "two phase" system, the signal is applied alternately to the two cathode groups represented by input terminals I and II.

Having described our invention, what we claim as new and desire to secure by Letters Patent is:

1. An improved timekeeping system comprising the combination of a glow discharge tube containing an ionizable gas and a series of spaced internal electrodes for counting successive time intervals in response to electrical input signals representing said time intervals, means for initiating a glow discharge at one of said electrodes, first electrical input means operatively connected to a first group of said electrodes and interconnecting the same to form a first cathode group, second electrical input means operatively connected to a second group of said electrodes and interconnecting the same to form a second cathode group, one of the cathodes of said first group being located between each pair of successive cathodes of said second group, and one of the cathodes of said second group being located between each pair of successive cathodes of said first group, and electrical control means operatively connected to said first and second electrical input means for applying a transfer potential for said glow discharge tube cyclically to said first and second cathode groups, one group at a time, in response to said electrical input signals so as to repetitively transfer the glow discharge directly between successive cathodes in said series, said control means including means for maintaining said glow discharge at each of said cathodes whereby a continual display of the instantaneous count or time is provided, and circuit means operatively connected between said first and second cathode groups and directly responsive to a glow discharge in one of said cathode groups for automatically applying the transfer potential to the other cathode group in response to the next input signal.

2. An improved timekeeping system as set forth in claim 1 further characterized in that said circuit means comprises electrical capacitor and diode means operatively connected between said first and second cathode groups and responsive to a glow discharge in one of said groups for storing an electrical charge, and responsive to said electrical input signals for reducing the potential at the cathode group having the glow discharge below the voltage required to maintain said glow discharge and increasing the potential at the other cathode group to the transfer potential in response to each electrical input signal.

3. An improved timekeeping system as set forth in claim 1 further characterized in that said circuit means comprises a first diode having one side connected to said first input means, a second diode having one side connected to said second input means, a first capacitor connected from the other side of said first diode to said second input means, and a second capacitor connected from the other side of said second diode to said first input means, and means responsive to each of said input signals for extinguishing the glow discharge in either of said first or second cathode groups whereby said capacitors and diodes automatically initiate a glow discharge in the other cathode group.

4. An improved timekeeping system as set forth in claim 1 further characterized in that said circuit means comprises diode means operatively connected between said first and second cathode groups for providing different predetermined potentials at said cathode groups in response to a glow discharge in one of said groups whereby a group without the glow discharge is always biased to receive said transfer potential in response to the next input pulse.

5. An improved timekeeping system as set forth in claim 1 further characterized in that said circuit means includes first and second electronic gates operatively connected between said first and second input means, each of said gates having a first input receiving said input signals, said first gate having a second input connected to said first cathode group for applying a transfer potential to said second cathode group upon receipt of an input signal while a glow discharge exists in said first cathode group, and said second gate having a second input connected to said second cathode group for applying a transfer potential to said first cathode group upon receipt of an input signal while a glow discharge exists in said second cathode group.

6. An improved timekeeping system as set forth in claim 1 which includes at least three electrical input means interconnecting said electrodes to form at least three separate cathode groups with each pair of successive electrodes in one group being spaced apart by at least one electrode from each of the other two groups, and said electrical control means is operatively connected to said three electrical input means for applying a transfer potential for said glow discharge tube cyclically to said three separate cathode groups, one group at a time, in response to said electrical input signals whereby said transfer potential is always applied to only one cathode directly adjacent a glowing cathode so as to step the glow discharge along successive cathodes in said series in a predetermined direction, and further characterized in that said control means includes circuit means operatively connected between each pair of said cathode groups and directly responsive to a glow discharge in one of said groups for automatically applying the transfer potential to the next successive cathode group in response to the next input signal.

(References on following page)

References Cited

UNITED STATES PATENTS

| | | | |
|---|---|---|---|
| 2,906,906 | 9/1959 | McCauley et al. | 313—109.5 |
| 3,119,950 | 1/1964 | Somlyody | 315—84.6 |
| 3,227,922 | 1/1966 | Glaser et al. | 315—135 |
| 2,608,674 | 8/1952 | Depp. | |
| 2,780,747 | 2/1957 | Jackson. | |
| 2,835,848 | 5/1958 | Gundlach et al. | 315—84.6 |
| 2,866,922 | 12/1958 | Matarese | 315—84.6 |
| 2,963,579 | 12/1960 | Berry | 315—84.6 X |

JAMES W. LAWRENCE, Primary Examiner

V. LAFRANCHI, Assistant Examiner

U.S. Cl. X.R.

235—92; 307—208, 218, 269